I. Stoddard,

Horse Power.

Nº 30,362. Patented Oct. 9, 1860.

Inventor:
Isaac Stoddard
by his Attorney
A. DuBois

M. Hurley
J. C. Heath

UNITED STATES PATENT OFFICE.

ISAAC STODDARD, OF GREAT BEND, PENNSYLVANIA.

PROPELLING MACHINERY BY HORSE-POWER.

Specification of Letters Patent No. 30,362, dated October 9, 1860.

*To all whom it may concern:*

Be it known that I, ISAAC STODDARD, of Great Bend, in the county of Susquehanna and State of Pennsylvania, have invented a new and useful Improvement in Machines for Applying the Power of Horses or other Animals to the Propelling of Machinery; and I do hereby declare the following to be a full and exact description thereof, reference being had to the accompanying drawings, making a part of this specification.

The nature of my invention consists in applying conical shaped friction rollers to the underside of the ordinary inclined rotating tread wheel. The circumference of the outside and inside ends of these rollers are made to bear the same proportion to each other that the circumference of the periphery of the tread wheel bears to the circle described by the rotation of the small end of the rollers, so that if one of these rollers were placed on a level surface and set in motion the two ends of it would describe two circles of the same dimensions of the two circles on the tread wheel mentioned above. Thus nearly the whole of the under surface of the tread-wheel is brought in contact with the surface of these rollers and the weight of the animal is brought to bear upon the whole length of them, transmitting the power of the animal to the machinery to be driven.

Figure 1:
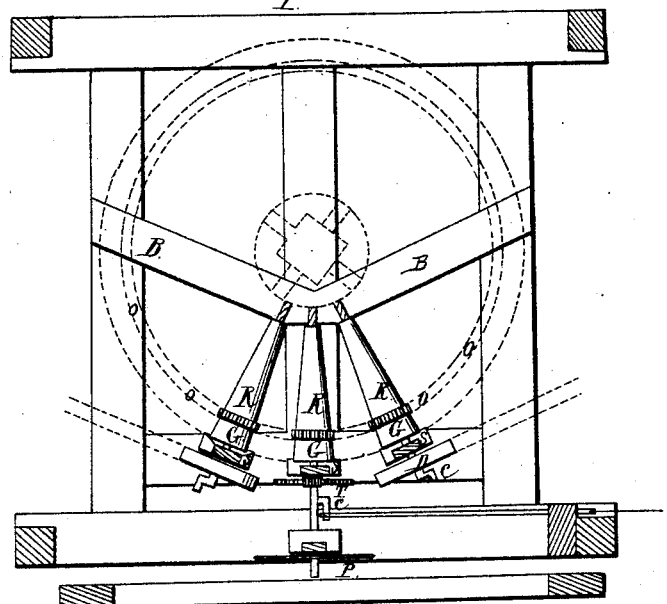
Figure 2:
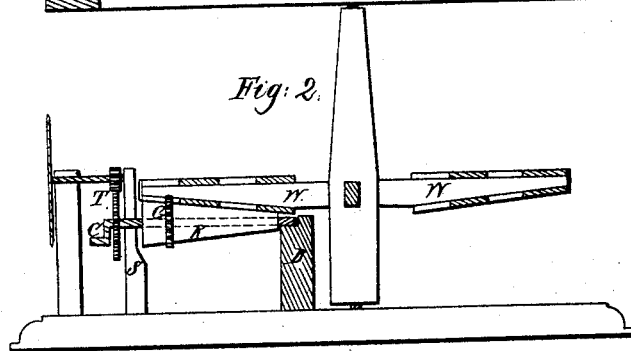
Figure 3:
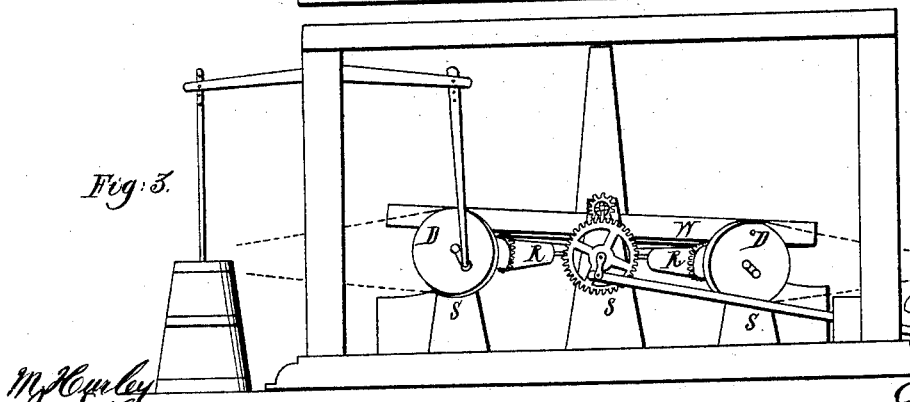

Having thus stated the nature and object of my invention I proceed to describe the same as follows:

Figure 1 is a longitudinal elevation, Fig. 2 a horizontal plan, and Fig. 3 is a section through the line P, P.

Like letters of reference indicate the same part in each figure.

W, is the inclined rotating tread wheel.

R, R, R, the conical shaped friction rollers, with shafts passing through them and resting on the block B, B, and supports S, S, S. To the shafts passing through these rollers may be attached band heads as shown at D, D; or cranks as C, C, C; or spur geared to horizontal shaft, as shown at T and made to carry a circular saw; or bevel-geared to upright shafts and made to carry a grinding mill.

A churning apparatus may be attached to one of the cranks, as shown in Fig. 1, and a cross cut saw attached to the middle crank as shown also in Fig. 1.

By making the inside of the tread wheel thicker than the outside, the shafts which form the axes of the friction rollers are placed in a horizontal position. A brake by which the motion of the tread-wheel may at any time be checked can be attached at any convenient point in the frame.

If desired a pinion may be attached to the friction rollers, as shown at G, and made to work in segments placed on the underside of the tread-wheel as represented by the dotted lines O, O, O.

The tread-wheel may be made wide enough for two horses to walk abreast upon it, and by the different attachments the machine may be used to carry on a variety of operations at the same time, such as threshing, grinding, sawing wood, churning &c.

The superiority of my invention over the ordinary arrangement of similar machines, consists in the great increase of power obtained, the variety of uses to which the power may be applied, the cheapness of its construction, and its durability.

What I claim as my invention and desire to secure by Letters Patent, is—

The arrangement of rollers R, R, wheel W, standards S, S, S, block B, cranks C, C, band wheels D, D, pinions G, G, and segments O, O, the whole combined and operating substantially as set forth.

ISAAC STODDARD.

Witnesses:
THOMAS KELDER,
JOHN S. GRAY.